US012584740B2

(12) United States Patent
Kondo

(10) Patent No.: US 12,584,740 B2
(45) Date of Patent: Mar. 24, 2026

(54) ELECTRONIC COMPONENT, SENSOR MODULE, AND METHOD FOR MANUFACTURING ELECTRONIC COMPONENT

(71) Applicant: SEIKO EPSON CORPORATION, Tokyo (JP)

(72) Inventor: Manabu Kondo, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 296 days.

(21) Appl. No.: 18/493,842

(22) Filed: Oct. 25, 2023

(65) Prior Publication Data

US 2024/0142232 A1    May 2, 2024

(30) Foreign Application Priority Data

Oct. 26, 2022    (JP) ................................. 2022-171237
Nov. 10, 2022    (JP) ................................. 2022-180119

(51) Int. Cl.
G01C 19/5783 (2012.01)
G01C 19/00 (2013.01)
(52) U.S. Cl.
CPC ................................. G01C 19/005 (2022.01)
(58) Field of Classification Search
CPC .............. G01C 19/005; G01C 19/5783; G01C 19/5628; G01C 19/5663
USPC ........ 73/493, 494, 504.02–504.16, 756, 431; 29/492.1, 593, 595, 712, 825, 827, 835, 29/874, 454, 462; 361/600, 627, 658, 361/659, 660, 664, 667, 679.01, 679.02, 361/679.03, 729, 731, 736, 749, 752, 789, 361/796, 807
See application file for complete search history.

(56) References Cited

U.S. PATENT DOCUMENTS 11,740,668 B2 *    8/2023   Asada ..................... G06F 1/189
361/679.02

FOREIGN PATENT DOCUMENTS

JP            2014-105997 A      6/2014

* cited by examiner

*Primary Examiner* — Robert R Raevis
(74) *Attorney, Agent, or Firm* — Harness, Dickey & Pierce, P.L.C.

(57) ABSTRACT

An electronic component includes: a substrate including a flexible wiring board having a first surface and a second surface that are in a front and back relationship, and a support plate having a first opening and joined to the first surface of the flexible wiring board; and a first component and a second component both disposed on the substrate. The substrate includes a first region in which the first surface extends along a first direction and a second direction orthogonal to each other, a second region that is disposed on one side of the first region in the first direction and in which the first surface extends along a third direction orthogonal to the first direction and the second direction, and a first coupling region that is located between the first region and the second region and is bent such that a support plate side is located inside. The first component is attached to the first surface in the first region via the first opening. The second component is attached to the second region.

19 Claims, 14 Drawing Sheets

ELECTRONIC COMPONENT, SENSOR MODULE, AND METHOD FOR MANUFACTURING ELECTRONIC COMPONENT

The present application is based on, and claims priority from JP Application Serial Number 2022-171237, filed on Oct. 26, 2022 and JP Application Serial Number 2022-180119, filed on Nov. 10, 2022, the disclosure of which is hereby incorporated by reference herein in its entirety.

BACKGROUND

1. Technical Field

The present disclosure relates to an electronic component, a sensor module, and a method for manufacturing an electronic component.

2. Related Art

JP-A-2014-105997 discloses an electronic component including a flexible wiring board, a first substrate located along a first surface of the flexible wiring board, a circuit chip located on a surface side opposite from the first surface of the flexible wiring board, and a second substrate having a recess on which the flexible wiring board is placed, in which the flexible wiring board is bent such that a circuit chip side is located inside.

However, in the electronic component disclosed in JP-A-2014-105997, a terminal of the circuit chip and a wiring of the flexible wiring board, and the wiring of the flexible wiring board and a terminal of the second substrate are electrically coupled by bonding wires, and thus when vibration or impact is applied, disconnection of the bonding wire may occur, resulting in a problem in reliability of electrical coupling.

SUMMARY

An electronic component includes: a substrate including a flexible wiring board having a first surface and a second surface that are in a front and back relationship, and a support plate having a first opening and joined to the first surface of the flexible wiring board; and a first component and a second component both disposed on the substrate. The substrate includes a first region in which the first surface extends along a first direction and a second direction orthogonal to each other, a second region that is disposed on one side of the first region in the first direction and in which the first surface extends along a third direction orthogonal to the first direction and the second direction, and a first coupling region that is located between the first region and the second region and is bent such that a support plate side is located inside. The first component is attached to the first surface in the first region via the first opening. The second component is attached to the second region.

A sensor module includes: a substrate including a flexible wiring board having a first surface and a second surface that are in a front and back relationship, and a support plate having a first opening and joined to the first surface of the flexible wiring board; and a first sensor device and a second sensor device both disposed on the substrate. When three axes orthogonal to one another are referred to as an X axis, a Y axis, and a Z axis, the first sensor device includes a first sensor element and a first package that accommodates the first sensor element and has a surface along the X axis and the Y axis and a thickness along the Z axis, and a direction of the thickness of the first package intersects a mounting surface of the first package attached to the substrate, and the second sensor device includes a second sensor element and a second package that accommodates the second sensor element and has a surface along the Y axis and the Z axis and a thickness along the X axis, and a direction of the thickness of the second package intersects a mounting surface of the second package attached to the substrate. The substrate includes a first region in which the first surface extends along a first direction and a second direction orthogonal to each other, a second region that is disposed on one side of the first region in the first direction and in which the first surface extends along a third direction orthogonal to the first direction and the second direction, and a first coupling region that is located between the first region and the second region and is bent such that a support plate side is located inside. The first sensor device is attached to the first surface in the first region via the first opening. The second sensor device is attached to the second region.

A method for manufacturing an electronic component includes a component attaching step of preparing a flexible wiring board having a first surface and a second surface that are in a front and back relationship, a first component, and a second component, attaching the first component to the first surface of the flexible wiring board, and attaching the second component to the first surface or the second surface; a substrate forming step of preparing a support plate having a first opening, and forming a substrate by joining the support plate to the first surface of the flexible wiring board such that the first component is disposed in the first opening; and a bending step of bending the substrate such that a support plate side of a first coupling region between a first region including the first component and a second region including the second component is to be inside.

DESCRIPTION OF EMBODIMENTS

1. First Embodiment 1.1. Electronic Component

First, a sensor module 1 including a three-axis gyro sensor as an electronic component according to a first embodiment will be described as an example with reference to FIGS. 1 to 5.

Figure 1:
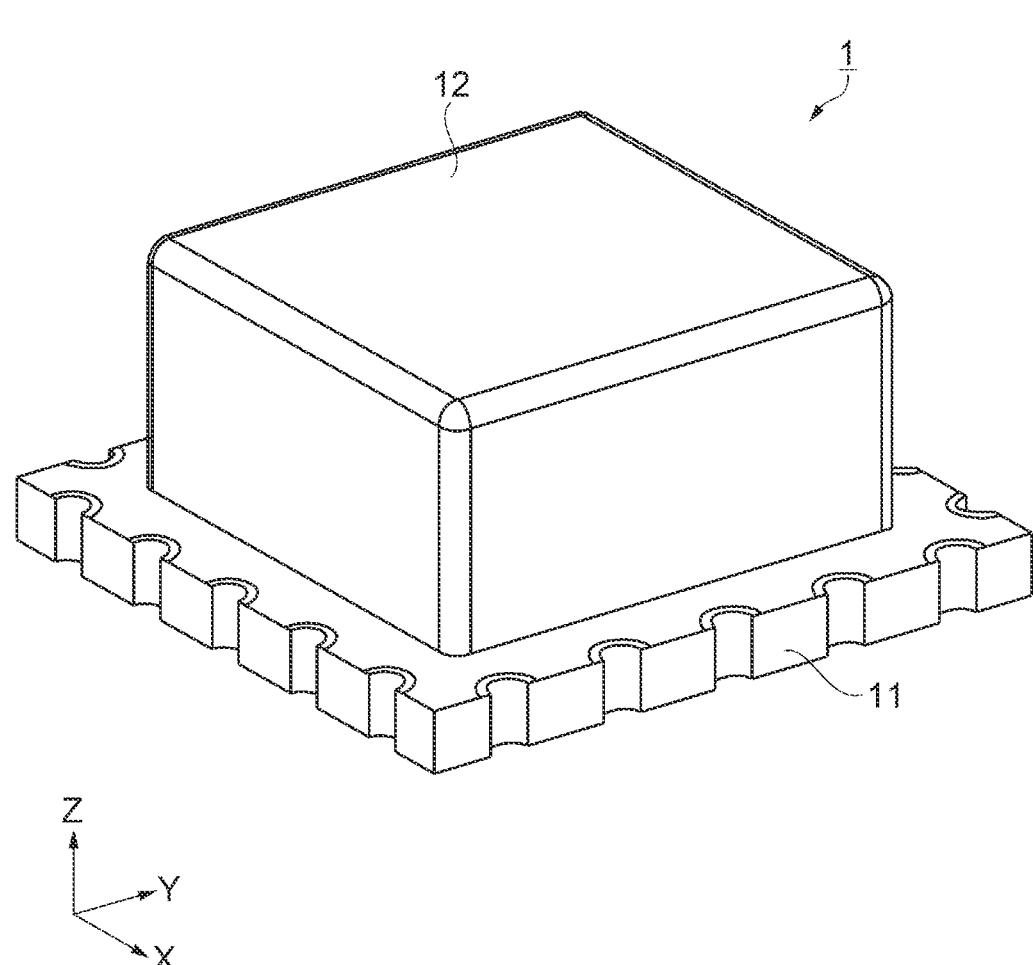
FIG. 1 is a perspective view showing a configuration of an electronic component according to a first embodiment.
Figure 2:
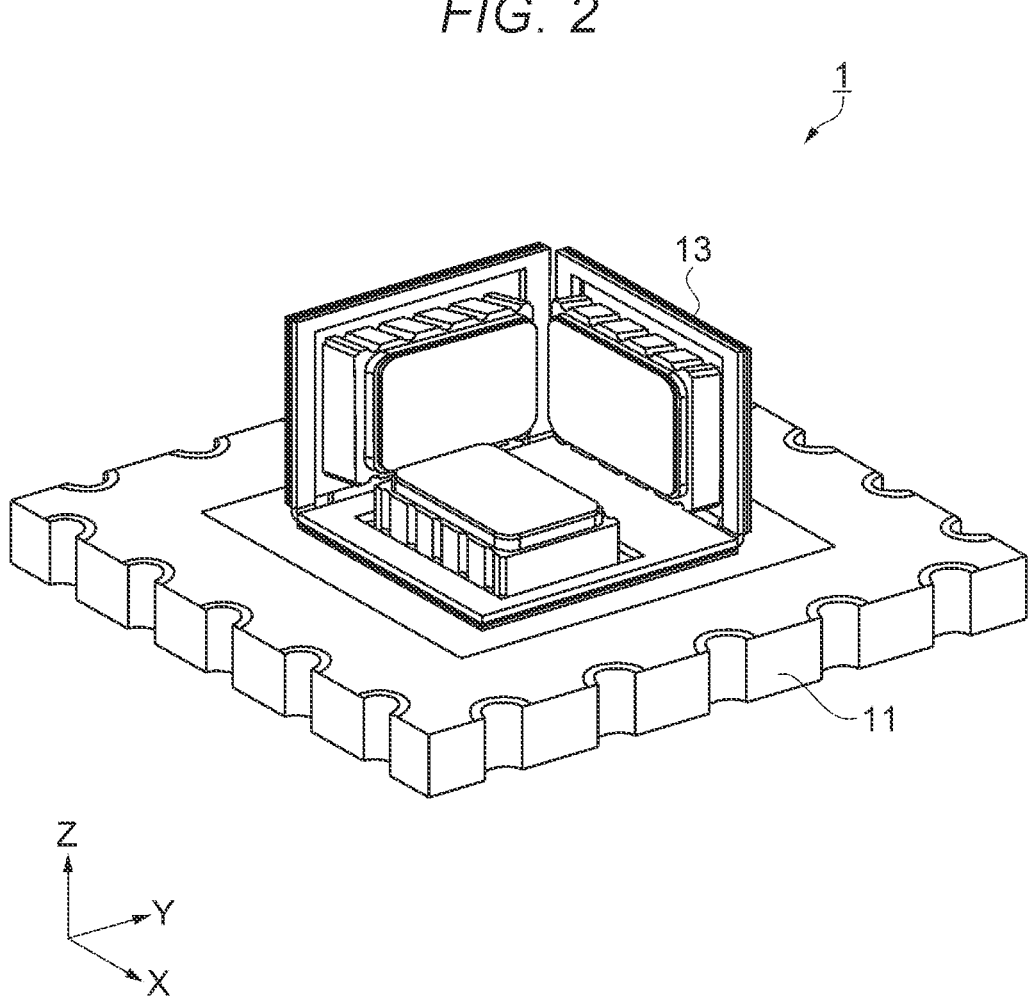
FIG. 2 is a perspective view showing the configuration of the electronic component according to the first embodiment.

FIG. 2 shows a state in which a case 12 is removed for convenience of describing an internal configuration of the sensor module 1. In FIGS. 1 to 5 and 15, an X axis, a Y axis, and a Z axis are shown as three axes orthogonal to one another for convenience of description. A direction along the X axis is referred to as an "X direction", a direction along the Y axis is referred to as a "Y direction", and a direction along the Z axis is referred to as a "Z direction". An arrow side of each axis is also referred to as a "plus side", and an opposite side from the arrow is also referred to as a "minus side". A Z direction plus side is also referred to as "upper", and a Z direction minus side is also referred to as "lower".

The sensor module 1 according to the embodiment is a three-axis gyro sensor that detects angular velocities around the X axis, the Y axis, and the Z axis orthogonal to one another, and includes a base substrate 11, the case 12 that accommodates a sensor unit 13 that detects the angular velocities around the three axes, and the sensor unit 13 as shown in FIGS. 1 and 2.

The base substrate 11 is a rectangular flat plate, a plurality of terminals are provided on an upper surface that is a flat surface on a case 12 side, and the sensor unit 13 that detects the angular velocities around the X axis, the Y axis, and the Z axis orthogonal to one another is mounted via solder or the like. A plurality of external terminals are provided on a lower surface.

The case 12 has a recess that opens toward the base substrate 11, and accommodates the sensor unit 13 in the recess. The case 12 is joined to the base substrate 11 via a joining material such as an adhesive.

Figure 3:
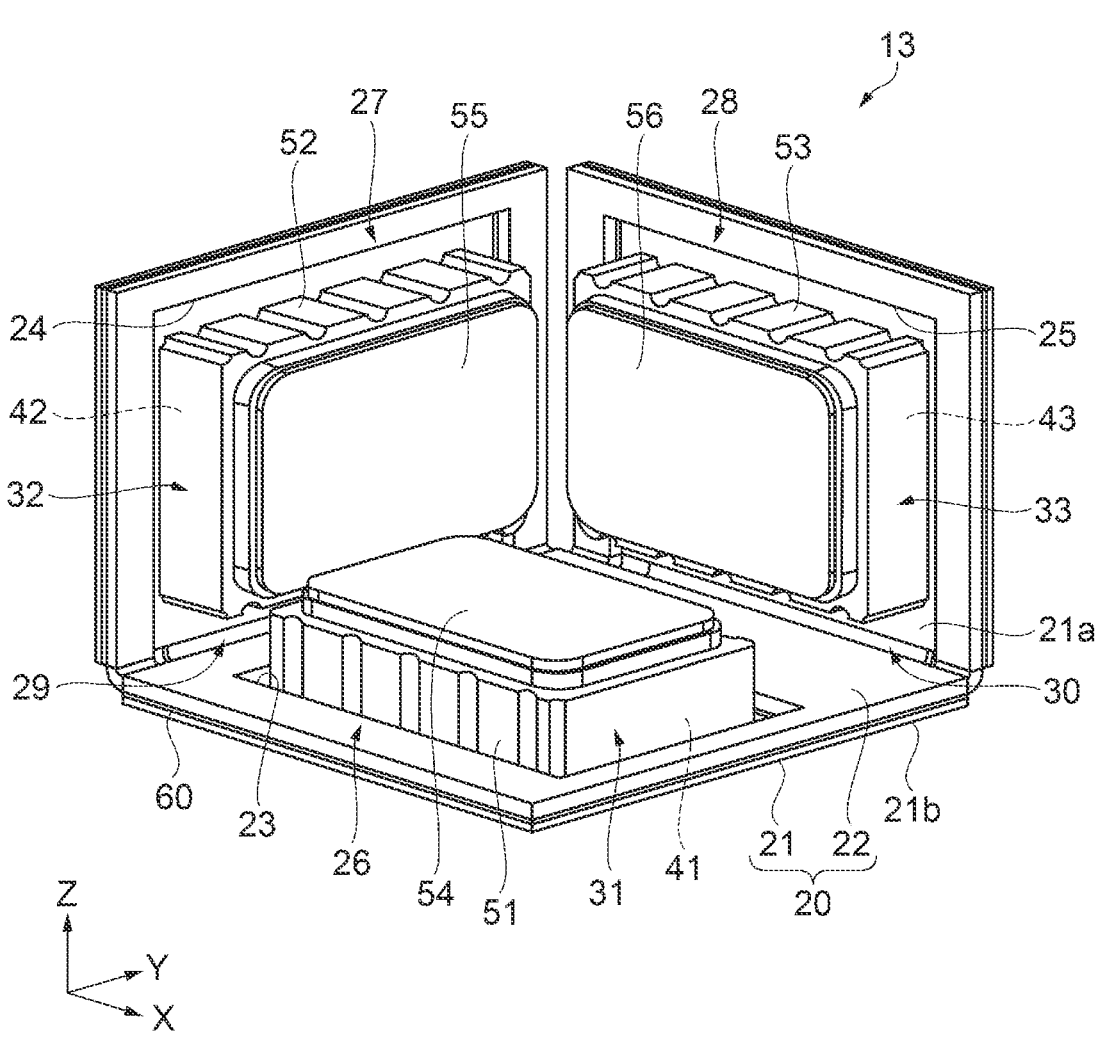
FIG. 3 is a perspective view showing a configuration of a sensor unit provided in the electronic component according to the first embodiment.

As shown in FIG. 3, the sensor unit 13 includes a substrate 20, a first sensor device 31 as a first component, a second sensor device 32 as a second component, and a third sensor device 33 as a third component which are disposed on the substrate 20.

The substrate 20 includes a flexible wiring board 21 having a first surface 21a and a second surface 21b that are in a front and back relationship, and a support plate 22 having a first opening 23, a second opening 24, and a third opening 25 and joined to the first surface 21a of the flexible wiring board 21 via an adhesive 60.

The substrate 20 includes a first region 26 in which the first surface 21a extends along the X direction as a first direction and the Y direction as a second direction orthogonal to each other, a second region 27 that is disposed on an X direction minus side which is one side of the first region 26 in the X direction and in which the first surface 21a extends along the Z direction as a third direction orthogonal to the X direction and the Y direction, a third region 28 that is disposed on a Y direction plus side which is one side of the first region 26 in the Y direction and in which the first surface 21a extends along the Z direction, a first coupling region 29 that is located between the first region 26 and the second region 27 and is bent such that a support plate 22 side is located inside, and a second coupling region 30 that is located between the first region 26 and the third region 28 and is bent such that a support plate 22 side is located inside.

Figure 4:
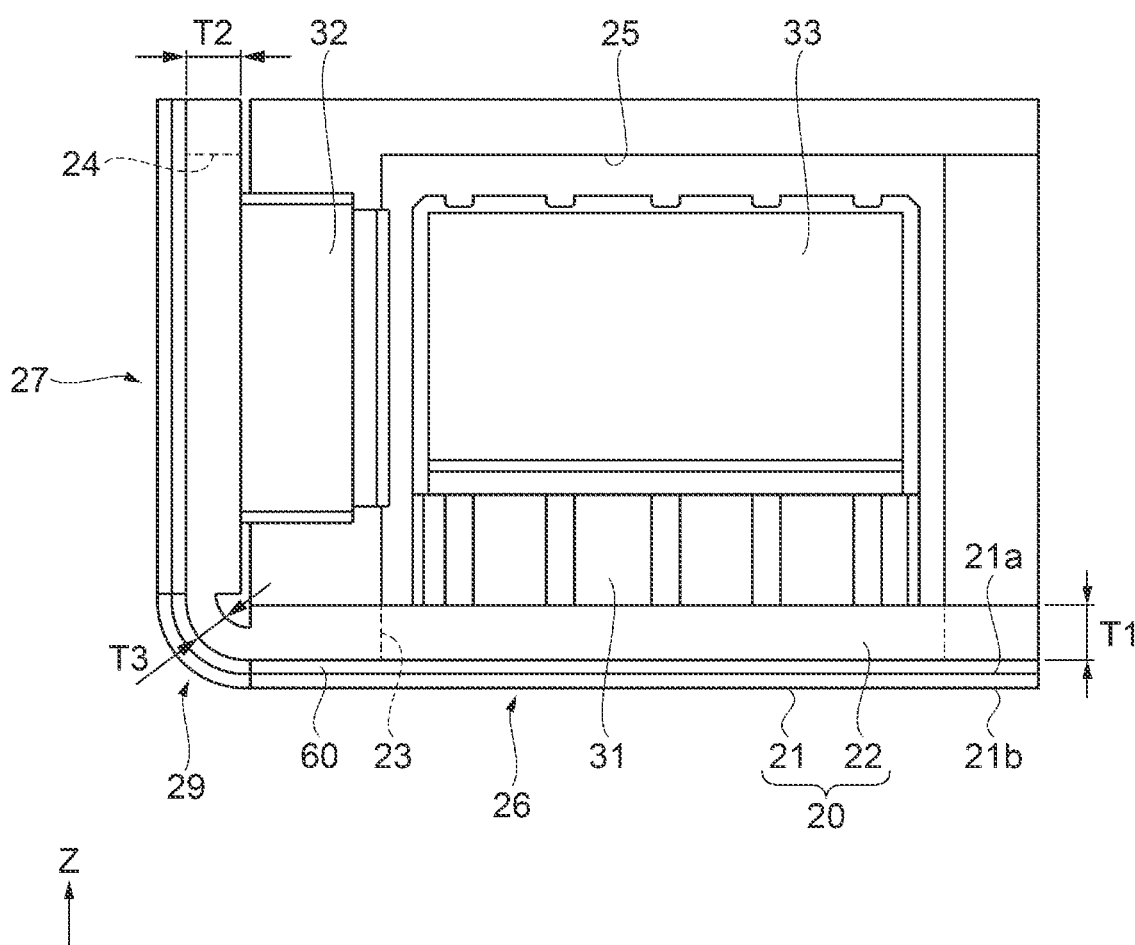
FIG. 4 is a side view showing the configuration of the sensor unit provided in the electronic component according to the first embodiment.

As shown in FIG. 4, a thickness T3 of the support plate 22 in the first coupling region 29 is smaller than thicknesses T1 and T2 of the support plate 22 in the first region 26 and the second region 27. Therefore, the support plate 22 is easily bent in the first coupling region 29. Similarly, a thickness of the support plate 22 in the second coupling region 30 is smaller than a thickness of the support plate 22 in other regions so as to facilitate a bending process.

Figure 5:
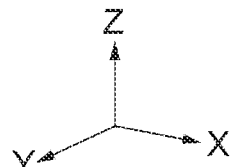
FIG. 5 is a perspective view showing the configuration of the sensor unit provided in the electronic component according to the first embodiment.

In the support plate 22, as shown in FIGS. 4 and 5, the second opening 24 in the second region 27 is formed from the second region 27 to the first coupling region 29, and a length L1 along the Y direction of the flexible wiring board 21 in the first coupling region 29 is within a range of a length L2 along the Y direction of the second opening 24 in the first coupling region 29. Therefore, the flexible wiring board 21 is not provided in a bent portion of the support plate 22, and the flexible wiring board 21 can be gently bent in the second opening 24, whereby distortion of the flexible wiring board 21 can be reduced. Similarly, in order to reduce the distortion of the flexible wiring board 21, the third opening 25 in the third region 28 is formed from the third region 28 to the second coupling region 30, and a length along the X direction of the flexible wiring board 21 in the second coupling region 30 is within a range of a length along the X direction of the third opening 25 in the second coupling region 30.

The first surface 21a of the flexible wiring board 21 is provided with a wiring for electrically coupling to the sensor devices 31, 32, and 33, and the second surface 21b of the flexible wiring board 21 is provided with a wiring electrically coupled to the wiring provided on the first surface 21a via a through wiring or the like. The wiring provided on the second surface 21b is electrically coupled to the terminal provided on the upper surface of the base substrate 11 via a conductive joining material.

The first sensor device 31 is a gyro sensor that detects an angular velocity around the Z axis. The first sensor device 31 includes a first sensor element 41, a first package 51 that accommodates the first sensor element 41 and has a surface along the X axis and the Y axis and a thickness along the Z axis, and a lid 54 that seals the first package 51 accommodating the first sensor element 41. The first sensor device 31 is attached to the first region 26.

More specifically, the first sensor device 31 is attached to the first surface 21a in the first region 26 via the first opening 23. A thickness direction of the first package 51 intersects a mounting surface of the first package 51 attached to the substrate 20.

The second sensor device 32 is a gyro sensor that detects an angular velocity around the X axis. The second sensor device 32 includes a second sensor element 42, a second package 52 that accommodates the second sensor element 42 and has a surface along the Y axis and the Z axis and a thickness along the X axis, and a lid 55 that seals the second package 52 accommodating the second sensor element 42. The second sensor device 32 is attached to the second region 27.

More specifically, the second sensor device 32 is attached to the first surface 21a in the second region 27 via the second opening 24. A thickness direction of the second package 52 intersects a mounting surface of the second package 52 attached to the substrate 20.

The third sensor device 33 is a gyro sensor that detects an angular velocity around the Y axis. The third sensor device 33 includes a third sensor element 43, a third package 53 that accommodates the third sensor element 43 and has a surface along the X axis and the Z axis and a thickness along the Y axis, and a lid 56 that seals the third package 53 accommodating the third sensor element 43. The third sensor device 33 is attached to the third region 28.

More specifically, the third sensor device 33 is attached to the first surface 21a in the third region 28 via the third opening 25. A thickness direction of the third package 53 intersects a mounting surface of the third package 53 attached to the substrate 20.

Each of the first sensor device 31, the second sensor device 32, and the third sensor device 33 includes a mounting surface attached to the first surface 21a, a lid surface on an opposite side from the mounting surface, side surfaces coupling the mounting surface and the lid surface, and a terminal disposed from the mounting surface to the side surfaces. The terminals are electrically coupled to the wiring provided on the first surface 21a of the flexible wiring board 21 via a conductive joining material. Therefore, it is not necessary to perform electrical coupling by a bonding wire, and reliability of the electrical coupling can be improved even when vibration or impact is applied.

As described above, in the sensor module 1 as the electronic component according to the embodiment, the sensor devices 31, 32, and 33 are electrically coupled to the wiring on the flexible wiring board 21 via the conductive joining material. The sensor unit 13 is electrically coupled to the base substrate 11 via a conductive joining material. Therefore, the bonding wire is not used in each electrical coupling, so that there is no possibility of disconnection of the bonding wire when vibration or impact is applied, and reliability of the electrical coupling can be improved. Therefore, the sensor module 1 having high reliability of electrical coupling can be obtained.

1.2. Method for Manufacturing Electronic Component

Next, a method for manufacturing the sensor module 1 as the electronic component according to the first embodiment will be described with reference to FIGS. 6 to 11.

Figure 6:
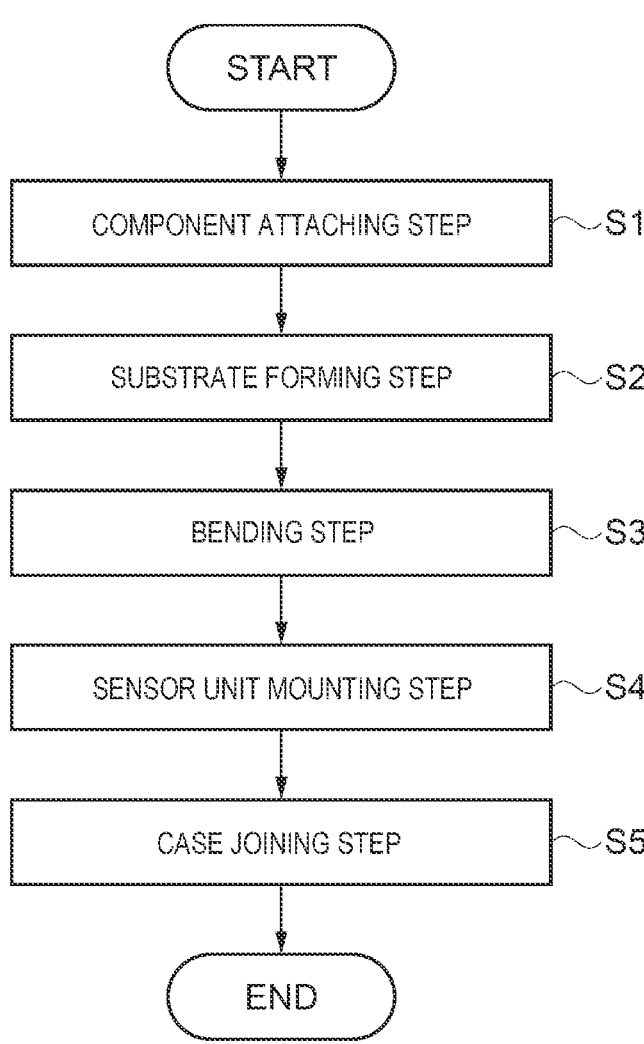
FIG. 6 is a flowchart showing a method for manufacturing the electronic component according to the first embodiment.

As shown in FIG. 6, the method for manufacturing the sensor module 1 according to the embodiment includes a component attaching step, a substrate forming step, a bending step, a sensor unit mounting step, and a case joining step.

1.2.1. Component Attaching Step

Figure 7:
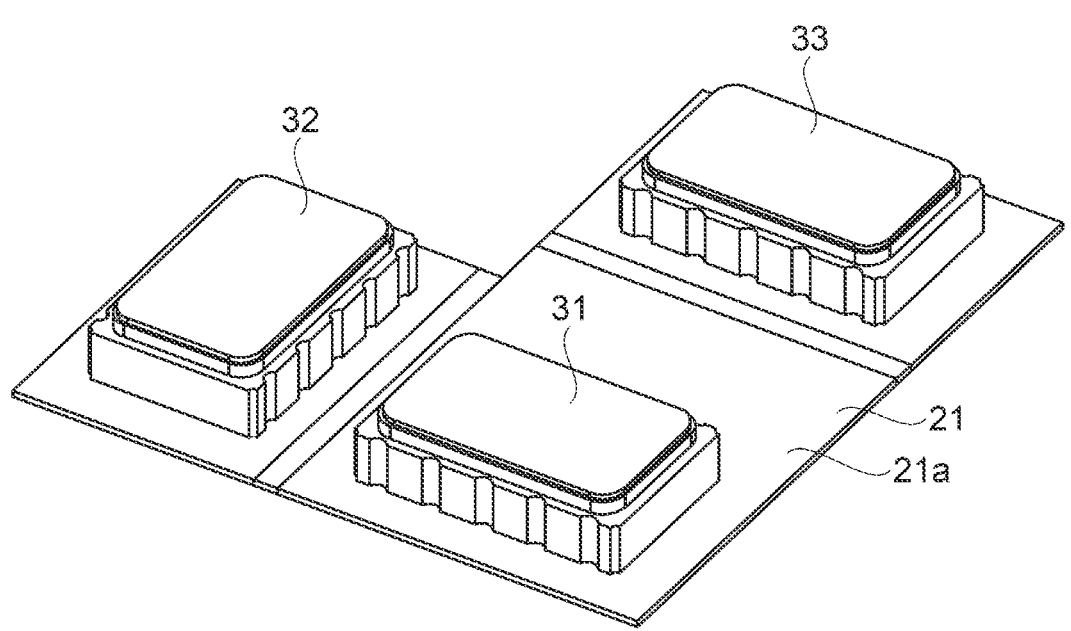
FIG. 7 is a perspective view showing the method for manufacturing the electronic component.

First, in step S1, the flexible wiring board 21 having the first surface 21a and the second surface 21b that are in a front and back relationship, the first sensor device 31 as a first component, the second sensor device 32 as a second component, and the third sensor device 33 as a third component are prepared. Next, as shown in FIG. 7, the first sensor device 31, the second sensor device 32, and the third sensor device 33 are attached to a wiring provided on the first surface 21a of the flexible wiring board 21 via a conductive joining material.

1.2.2. Substrate Forming Step

Figure 8:
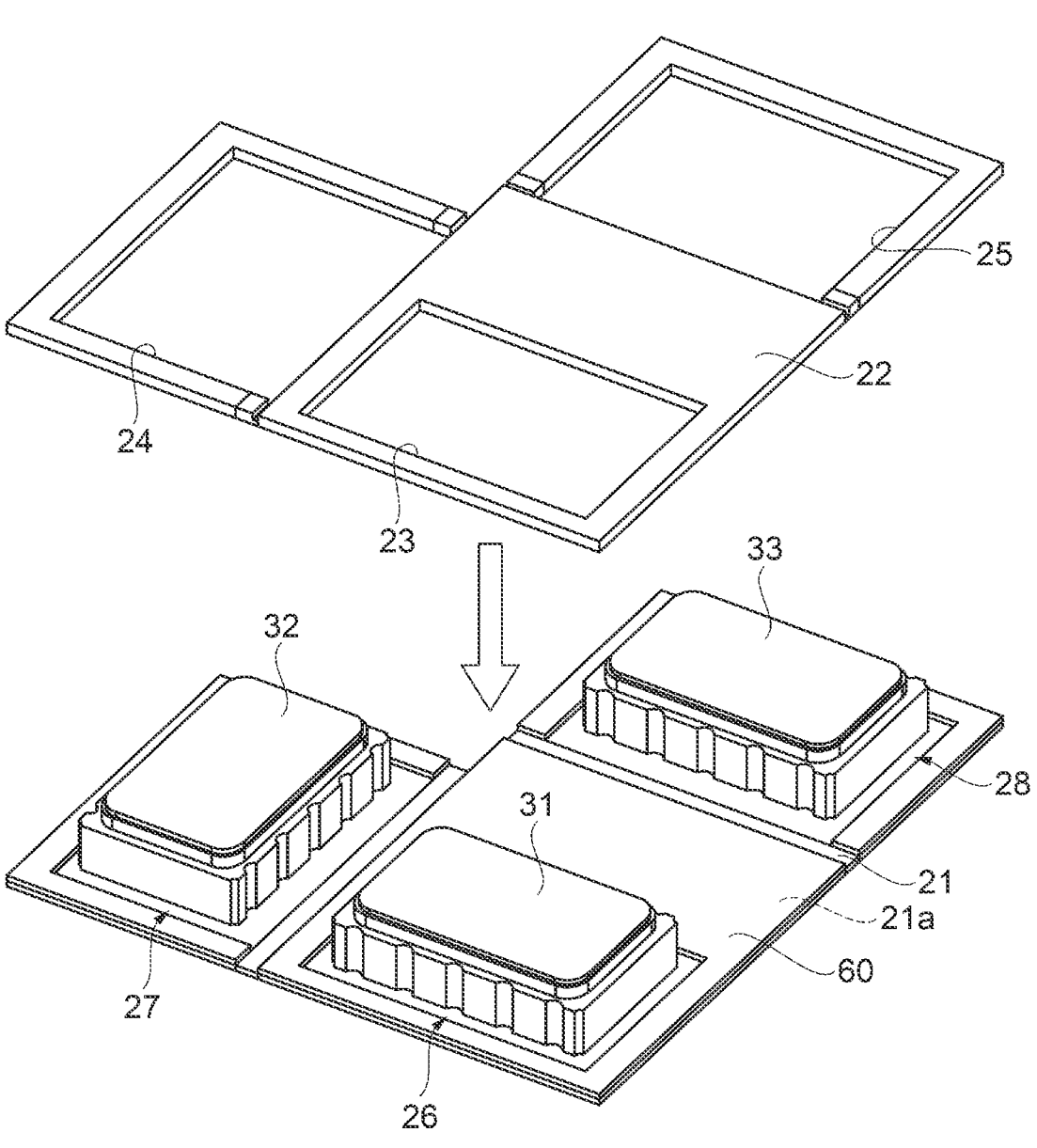
FIG. 8 is a perspective view showing the method for manufacturing the electronic component.

In step S2, the support plate 22 having the first opening 23 in the first region 26, the second opening 24 in the second region 27, and the third opening 25 in the third region 28 is prepared. Next, as shown in FIG. 8, the substrate 20 is formed by joining the support plate 22 to the first surface 21a of the flexible wiring board 21 via the adhesive 60 such that the first sensor device 31 is disposed in the first opening 23, the second sensor device 32 is disposed in the second opening 24, and the third sensor device 33 is disposed in the third opening 25.

1.2.3. Bending Step

Figure 9:
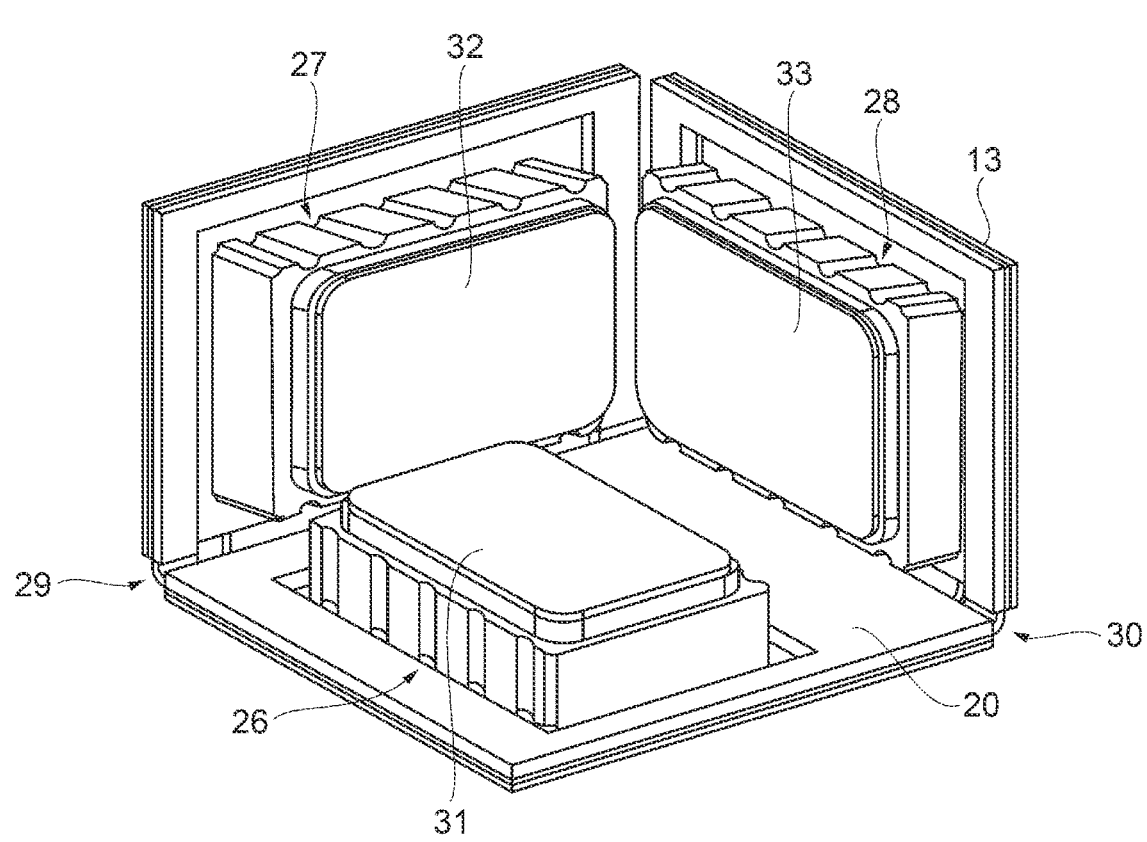
FIG. 9 is a perspective view showing the method for manufacturing the electronic component.

In step S3, as shown in FIG. 9, first, the substrate 20 is bent such that the support plate 22 side of the first coupling region 29 between the first region 26 including the first sensor device 31 and the second region 27 including the second sensor device 32 is to be inside. More specifically, the substrate 20 is bent such that the first surface 21a in the second region 27 is along the Z direction. Next, the substrate 20 is bent such that the support plate 22 side of the second coupling region 30 between the first region 26 including the first sensor device 31 and the third region 28 including the third sensor device 33 is to be inside. More specifically, the substrate 20 is bent such that the first surface 21a in the third region 28 is along the Z direction.

1.2.4. Sensor Unit Mounting Step

Figure 10:
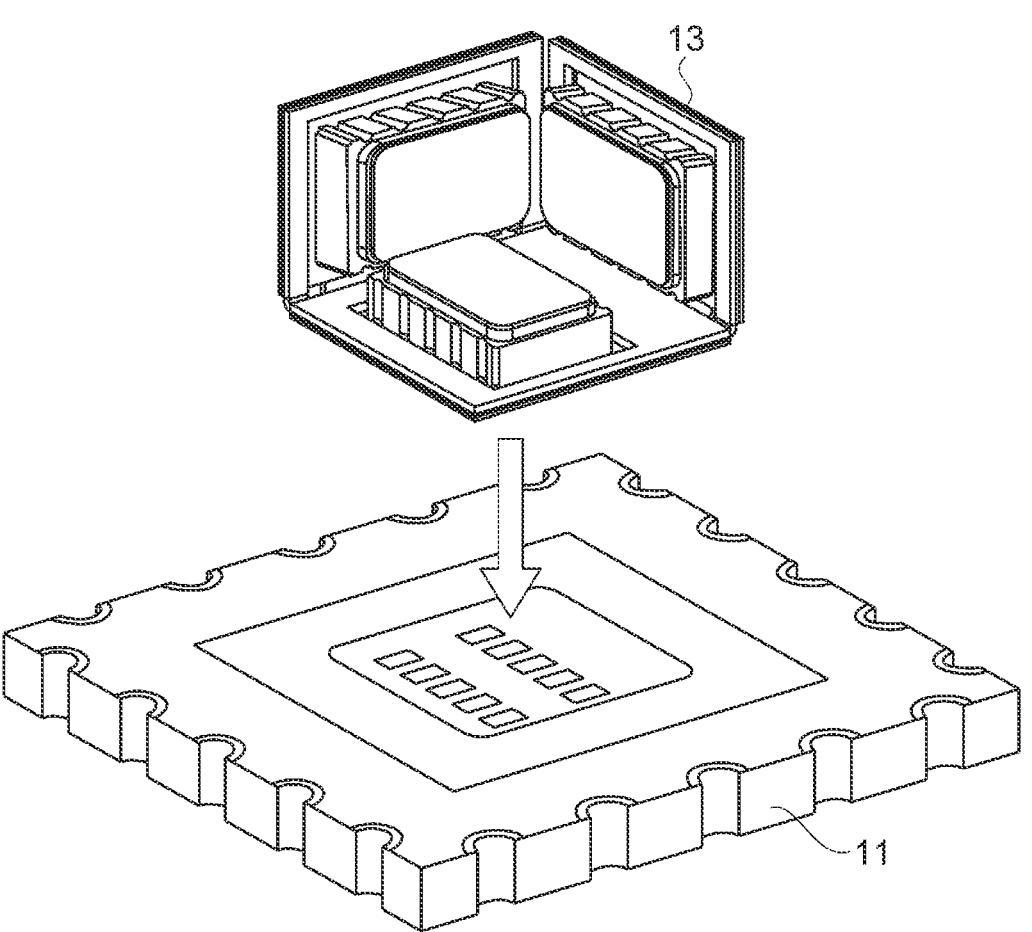
FIG. 10 is a perspective view showing the method for manufacturing the electronic component.

In step S4, the base substrate 11 is prepared, and as shown in FIG. 10, the sensor unit 13 is disposed on an upper surface of the base substrate 11, and the base substrate 11 and the sensor unit 13 are joined by a conductive joining material. More specifically, the terminal provided on the base substrate 11 is electrically coupled to a wiring provided on the second surface 21b of the flexible wiring board 21 of the sensor unit 13 by a conductive joining material.

1.2.5. Case Joining Step

Figure 11:
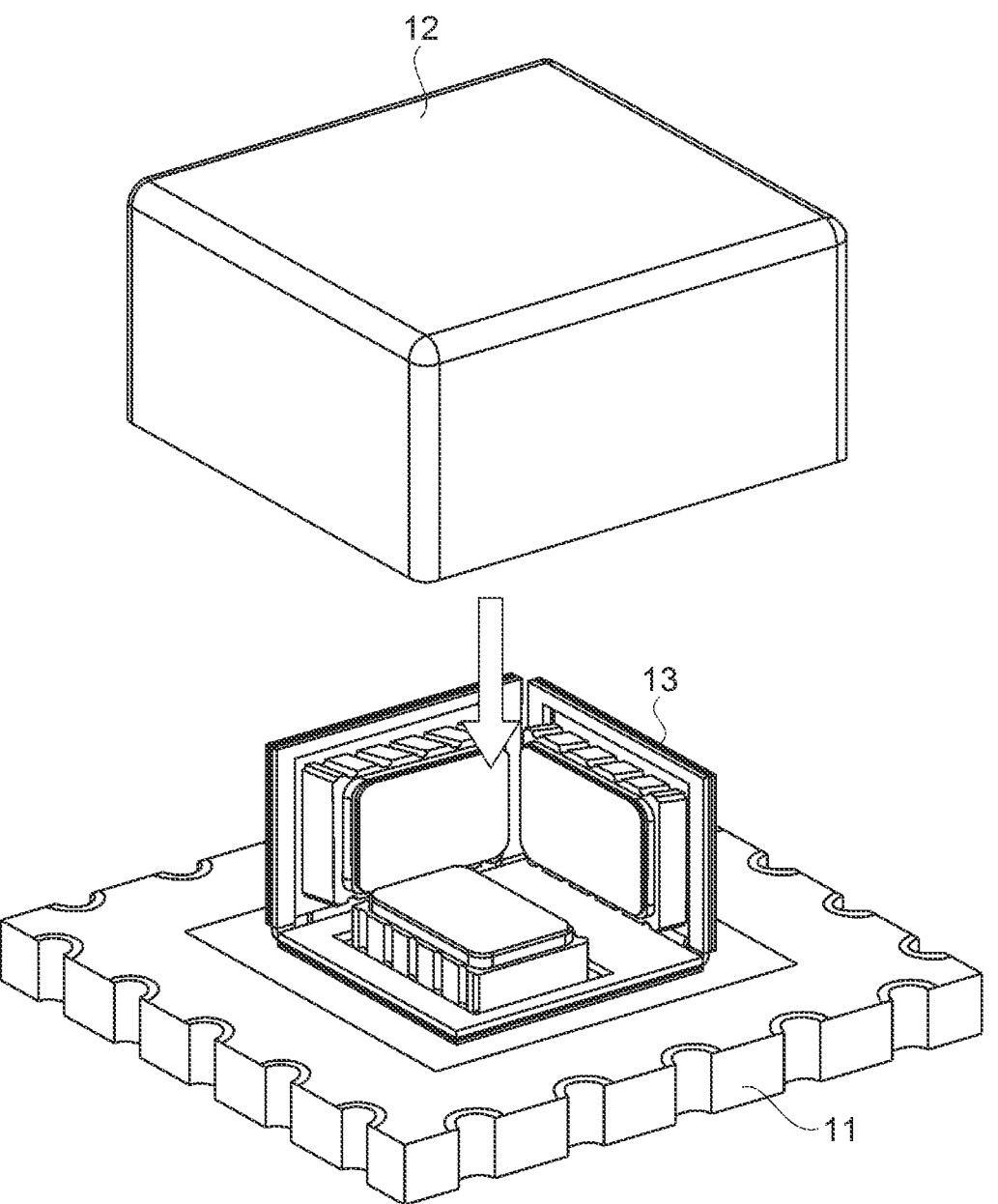
FIG. 11 is a perspective view showing the method for manufacturing the electronic component.

In step S5, the case 12 is prepared, and as shown in FIG. 11, the case 12 is disposed to cover the sensor unit 13 mounted on the base substrate 11, and the case 12 is joined to the base substrate 11 by a joining material.

Through the above steps, the sensor module 1 is completed.

In the embodiment, the substrate forming step is performed after the component attaching step, but the present disclosure is not limited thereto, and the component attaching step may be performed after the substrate forming step.

As described above, in the method for manufacturing the sensor module 1 as the electronic component according to the embodiment, in the component attaching step, the conductive joining material is interposed for electrical coupling between each of the sensor devices 31, 32, and 33 and the wiring on the flexible wiring board 21. In the sensor unit mounting step, the sensor unit 13 is electrically coupled to the base substrate 11 via the conductive joining material. Therefore, the bonding wire is not used in each electrical coupling, so that there is no possibility of disconnection of the bonding wire when vibration or impact is applied, and reliability of the electrical coupling can be improved. Therefore, the sensor module 1 having high reliability of electrical coupling can be manufactured.

1.3.1. First Modification of Method for Manufacturing Electronic Component

Next, a first modification of the method for manufacturing the sensor module 1 as the electronic component will be described with reference to FIGS. 12 and 13.

Figure 12:
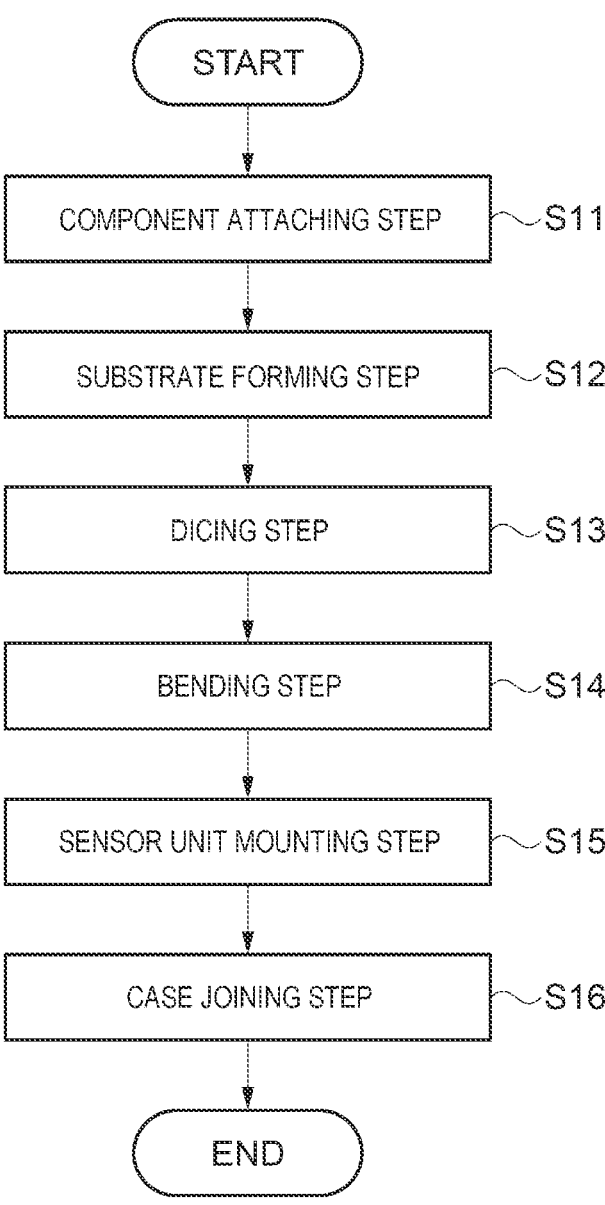
FIG. 12 is a flowchart showing a method for manufacturing an electronic component according to a first modification.

As shown in FIG. 12, the method for manufacturing the sensor module 1 according to the first modification includes a component attaching step, a substrate forming step, a dicing step, a bending step, a sensor unit mounting step, and a case joining step.

First, in the component attaching step that is step S11, a rectangular flexible wiring board 61 that couples regions constituting a plurality of first sensor devices 31, second sensor devices 32, and third sensor devices 33, and the plurality of first sensor devices 31, second sensor devices 32, and third sensor devices 33 are prepared, and the sensor devices 31, 32, and 33 are mounted on the flexible wiring board 61.

Figures 13, 14:
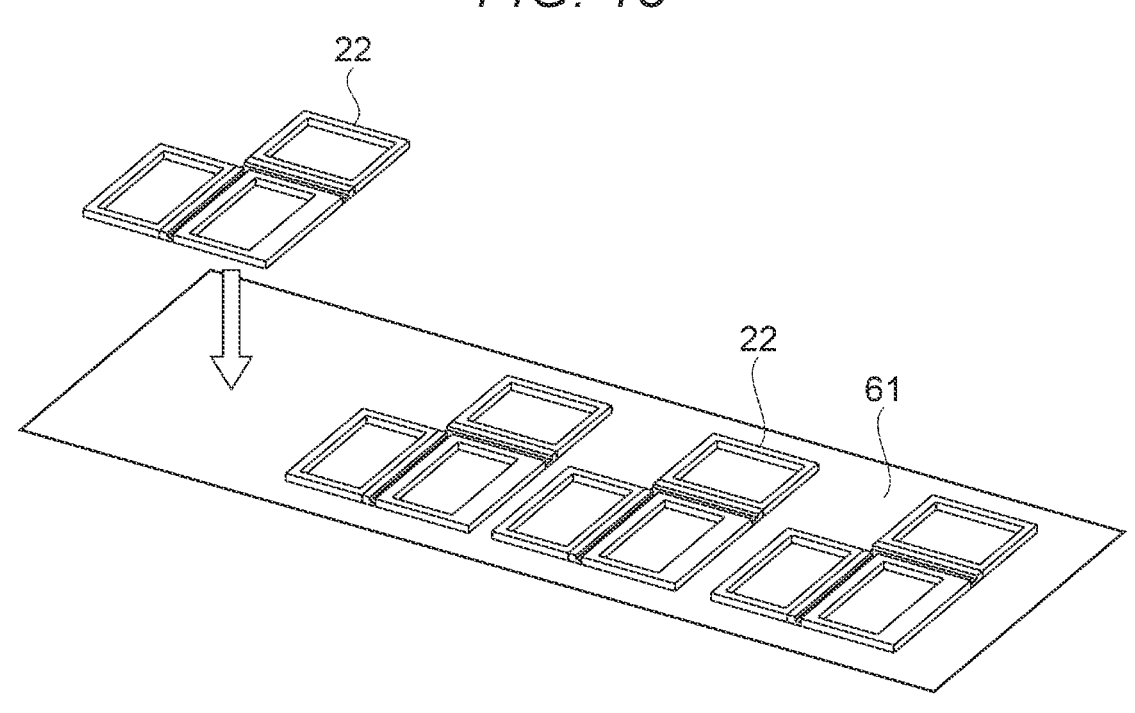
FIG. 13 is a perspective view showing the modification of the method for manufacturing the electronic component.
FIG. 14 is a plan view showing a modification of the method for manufacturing the electronic component.

Next, in the substrate forming step that is step S12, a plurality of support plates 22 are prepared, and as shown in FIG. 13, the plurality of support plates 22 are disposed on and bonded to the flexible wiring board 61.

Next, in the dicing step that is step S13, the flexible wiring board 61 is cut and diced into the substrates 20 to each of which the support plate 22 is bonded.

Next, in the bending step that is step S14, the first coupling region 29 and the second coupling region 30 are bent such that the support plate 22 side is located inside, and the sensor unit 13 is completed.

According to such a manufacturing method, a plurality of substrates 20 can be manufactured collectively, and a manufacturing cost can be reduced.

1.3.2. Second Modification of Method for Manufacturing Electronic Component

Next, a second modification of the method for manufacturing the electronic component will be described with reference to FIG. 14.

A manufacturing process of the second modification is the same as a manufacturing process of the first modification. In the substrate forming step that is step S12, as shown in FIG. 14, a support plate substrate 62 in which the plurality of support plates 22*b* are formed via a frame portion 63 is prepared, and only the support plates 22*b* in the support plate substrate 62 are bonded to the rectangular flexible wiring board 61. Then, in the dicing step that is step S13, the frame portion 63 is removed and the flexible wiring board 61 is cut, whereby the flexible wiring board 61 is diced into the substrates 20 to each of which the support plate 22*b* is bonded. Thereafter, in the bending step that is step S14, the first coupling region 29 and the second coupling region 30 are bent such that a support plate 22*b* side is located inside, and the sensor unit 13 is completed.

According to such a manufacturing method, the number of steps of bonding the support plates 22*b* to the flexible wiring board 61 is reduced, and a plurality of substrates 20 can be collectively manufactured as in the first modification, thereby further reducing a manufacturing cost.

2. Second Embodiment

Next, a sensor module 1*a* as an electronic component according to a second embodiment will be described with reference to FIG. 15.

Figure 15:
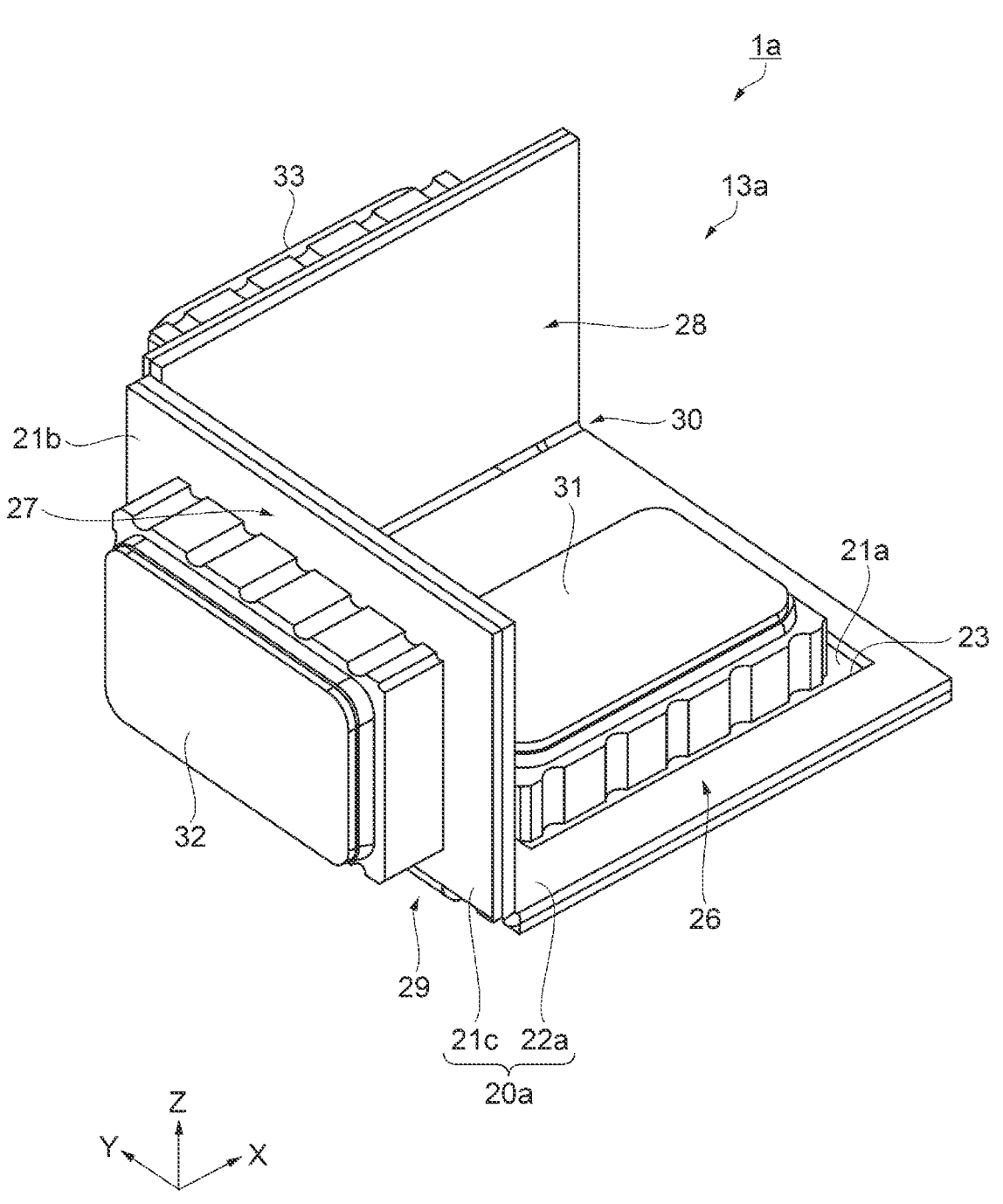
FIG. 15 is a perspective view showing a configuration of a sensor unit provided in an electronic component according to a second embodiment.

FIG. 15 only shows a sensor unit 13*a* for convenience of describing an internal configuration of the sensor module 1*a*.

The sensor module 1*a* according to the embodiment is the same as the sensor module 1 according to the first embodiment except that a structure of the sensor unit 13*a* is different from that of the sensor module 1 according to the first embodiment. The difference from the first embodiment described above will be mainly described, the same matters are denoted by the same reference numerals, and description thereof will be omitted.

The sensor module 1*a* according to the embodiment includes the base substrate 11 (not shown), the case 12 (not shown) that accommodates the sensor unit 13*a* that detects angular velocities around three axes, and the sensor unit 13*a*.

As shown in FIG. 15, the sensor unit 13*a* includes a substrate 20*a*, the first sensor device 31 as a first component, the second sensor device 32 as a second component, and the third sensor device 33 as a third component which are disposed on the substrate 20*a*.

The substrate 20*a* includes a flexible wiring board 21*c* having the first surface 21*a* and the second surface 21*b* that are in a front and back relationship, and a support plate 22*a* having the first opening 23 and joined to the first surface 21*a* of the flexible wiring board 21*c*.

The first sensor device 31 is a gyro sensor that detects an angular velocity around the Z axis, and is attached to the first region 26. More specifically, the first sensor device 31 is attached to the first surface 21*a* in the first region 26 via the first opening 23.

The second sensor device 32 is a gyro sensor that detects an angular velocity around the X axis, and is attached to the second surface 21*b* in the second region 27.

The third sensor device 33 is a gyro sensor that detects an angular velocity around the Y axis, and is attached to the second surface 21*b* in the third region 28.

With this configuration, the same effects as those attained in the first embodiment can be attained.

What is claimed is:

1. An electronic component comprising:
a substrate including a flexible wiring board and a support plate on the flexible wiring board, the flexible wiring board having a first surface and a second surface outwardly opposite to each other, the support plate having a first opening and joined to the first surface of the flexible wiring board; and
a first component and a second component disposed at first and second regions of the substrate, respectively, wherein
the first surface of the first region extends along a first plane extending along a first direction and a second direction orthogonal to each other,
the first surface of the second region extends along a second plane extending along the second direction and a third direction, and the third direction is orthogonal to the first direction and the second direction,
a first coupling region is located between one side of the first region and one side of the second region, and the first coupling region extends along the second direction,
the substrate is bent at the first coupling region such that the support plate of the first region and the support plate of the second region inwardly face each other,
the first component is attached to the first surface of the flexible wiring board in the first region of the substrate via the first opening of the support plate, and
the second component is attached to one of the first and second surfaces of the flexible wiring board in the second region of the substrate.

2. The electronic component according to claim 1, wherein
the second surface of the flexible wiring board in the second region of the substrate extends along the second plane, and
the second component is attached to the second surface of the flexible wiring board in the second region of the substrate.

3. The electronic component according to claim 1, wherein
the support plate has a second opening in the second region of the substrate, and
the second component is attached to the first surface of the flexible wiring board in the second region of the substrate via the second opening.

4. The electronic component according to claim 3, wherein a thickness of the support plate in the first coupling region is smaller than a thickness of the support plate in each of the first region and the second region.

5. The electronic component according to claim 3, wherein the second opening in the second region is formed from the second region to the first coupling region, and a length along the second direction of the flexible wiring board in the first coupling region is within a range of a length along the second direction of the second opening in the first coupling region.

6. The electronic component according to claim 1, further comprising:

a third component disposed at a third region of the substrate, wherein each of the first and second surfaces of the flexible wiring board in the third region extends along a third plane extending along the first direction and the third direction, a second coupling region is located between one side of the first region and one side of the third region, and the second coupling region extends along the first direction, the substrate is bent at the second coupling region such that the support plate of the first region and the support plate of the third region inwardly face each other, and the third component is attached to one of the first and second surfaces of the flexible wiring board in the third region of the substrate.

7. The electronic component according to claim 6, wherein the third component is attached to the second surface of the flexible wiring board in the third region of the substrate.

8. The electronic component according to claim 6, wherein the support plate has another opening in the third region of the substrate, and the third component is attached to the first surface of the flexible wiring board in the third region of the substrate via the another opening.

9. The electronic component according to claim 6, wherein each of the first component, the second component, and the third component includes a mounting surface attached to the first surface, a lid surface on an opposite side from the mounting surface, a side surface coupling the mounting surface and the lid surface, and a terminal disposed from the mounting surface to the side surface, and the terminal is electrically coupled to a wiring on the flexible wiring board via a conductive joining material.

10. A sensor module comprising:

a substrate including a flexible wiring board and a support plate on the flexible wiring board, the flexible wiring board having a first surface and a second surface outwardly opposite to each other, the support plate having a first opening and joined to the first surface of the flexible wiring board; and a first sensor device and a second sensor device disposed at first and second regions of the substrate, respectively, wherein three axes orthogonal to one another are defined as an X axis, a Y axis, and a Z axis, the first sensor device includes a first sensor element and a first package that accommodates the first sensor element and has a surface along the X axis and the Y axis and a thickness along the Z axis, and a direction of the thickness of the first package intersects a mounting surface of the first package attached to the substrate, and the second sensor device includes a second sensor element and a second package that accommodates the second sensor element and has a surface along the Y axis and the Z axis and a thickness along the X axis, and a direction of the thickness of the second package intersects a mounting surface of the second package attached to the substrate, the substrate includes a first region in which the first surface extends along a first plane extending along the X axis and the Y axis, a second region that is disposed on one side of the first region in the X axis and in which the first surface extends along a second plane extending along the Y axis and the Z axis, and a first coupling region that is located between one side of the first region and one side of the second region, and the first coupling region extends along the Y axis, the substrate is bent at the first coupling region such that the support plate of the first region and the support plate of the second region inwardly face each other, the first sensor device is attached to the first surface of the flexible wiring board in the first region of the substrate via the first opening of the support plate, and the second sensor device is attached to one of the first and second surfaces of the flexible wiring board in the second region of the substrate.

11. The sensor module according to claim 10, wherein the second surface of the flexible wiring board in the second region of the substrate extends along the second plane, and the second sensor device is attached to the second surface of the flexible wiring board in the second region of the substrate.

12. The sensor module according to claim 10, wherein the support plate has a second opening in the second region of the substrate, and the second sensor device is attached to the first surface of the flexible wiring board in the second region of the substrate via the second opening.

13. The sensor module according to claim 10, further comprising:

a third sensor device disposed at a third region of the substrate, wherein the third sensor device includes a third sensor element and a third package that accommodates the third sensor element and has a surface along the X axis and the Z axis and a thickness along the Y axis, a direction of the thickness of the third package intersects a mounting surface of the third package attached to the substrate, each of the first and second surfaces of the flexible wiring board in the third region extends along a third plane extending along the X axis and the Z axis, a second coupling region is located between one side of the first region and one side of the third region, and the second coupling region extends along the X axis, the substrate is bent at the second coupling region such that the support plate of the first region and the support plate of the third region inwardly face each other, and the third sensor device is attached to one of the first and second surfaces of the flexible wiring board in the third region of the substrate.

14. The sensor module according to claim 13, wherein the support plate has another opening in the third region of the substrate, and the third sensor device is attached to the first surface of the flexible wiring board in the third region of the substrate via the another opening.

15. A method for manufacturing an electronic component, the electronic component including:

a substrate including a flexible wiring board and a support plate on the flexible wiring board, the flexible wiring board having a first surface and a second surface outwardly opposite to each other, the support plate having a first opening and joined to the first surface of the flexible wiring board; and a first component and a second component disposed at first and second regions of the substrate, respectively, wherein the first surface of the first region extends along a first plane extending along a first direction and a second direction orthogonal to each other, the first surface of the second region extends along a second plane extending along the second direction and a third direction, and the third direction is orthogonal to the first direction and the second direction, and a first coupling region is located between one side of the first region and one side of the second region, and the first coupling region extends along the second direction, the method comprising:

preparing the flexible wiring board having the first surface and the second surface;

attaching the first component to the first surface of the flexible wiring board;

attaching the second component to one of the first surface and the second surface;

preparing the support plate having the first opening;

joining the support plate of the first region to the first surface of the flexible wiring board such that the first component is disposed in the first region of the substrate via the first opening of the support plate;

joining the support plate of the second region to the one of the first and second surfaces of the flexible wiring board such that the second component is disposed in the second region of the substrate; and bending the substrate at the first coupling region such that the support plate of the first region including the first component and the support plate of the second region including the second component inwardly face each other.

16. The method for manufacturing the electronic component according to claim 15, wherein the support plate has a second opening in the second region of the substrate, and the second component is attached to the first surface of the flexible wiring board in the second region of the substrate via the second opening.

17. The method for manufacturing the electronic component according to claim 15, further comprising:

preparing a second coupling region that is located between one side of the first region and one side of a third region of the substrate, the second coupling region extending along the first direction, wherein each of the first and second surfaces of the flexible wiring board in the third region extends along a third plane extending along the first direction and the third direction;

attaching a third component to one of the first surface and the second surface of the flexible wiring board in the third region of the substrate; and bending the substrate at the second coupling region such that the support plate of the third region including the third component and the support plate of the first region including the first component inwardly face each other.

18. The method for manufacturing the electronic component according to claim 17, wherein the support plate has another opening in the third region of the substrate, and the third component is attached to the first surface of the flexible wiring board in the third region of the substrate via the another opening.

19. The method for manufacturing the electronic component according to claim 17, wherein the second region is located on one side of the first region in the first direction via the first coupling region, and the third region is located on another side of the first region in the second direction, and via the second coupling region.

* * * * *